(12) United States Patent
Fujiwara et al.

(10) Patent No.: US 6,572,117 B2
(45) Date of Patent: Jun. 3, 2003

(54) GLAND PACKING

(75) Inventors: Masaru Fujiwara, Sanda (JP); Takashi Ikeda, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/926,022

(22) PCT Filed: Dec. 25, 2000

(86) PCT No.: PCT/JP00/09175
§ 371 (c)(1),
(2), (4) Date: Aug. 15, 2001

(87) PCT Pub. No.: WO01/48401
PCT Pub. Date: Jul. 5, 2001

(65) Prior Publication Data
US 2003/0085528 A1 May 8, 2003

(30) Foreign Application Priority Data
Dec. 27, 1999 (JP) ............................................ 11-369909

(51) Int. Cl.[7] ................................................. F16J 15/18
(52) U.S. Cl. ........................ 277/529; 277/530; 277/534; 277/537; 277/539
(58) Field of Search ................................ 277/534, 230, 277/510–542

(56) References Cited

U.S. PATENT DOCUMENTS

| 5,240,769 A | * | 8/1993 | Ueda | 428/365 |
| 5,370,405 A | * | 12/1994 | Ueda | 277/230 |
| 5,605,341 A | * | 2/1997 | Ueda | 277/204 |

FOREIGN PATENT DOCUMENTS

JP  6-279752  10/1994

* cited by examiner

Primary Examiner—Anthony Knight
Assistant Examiner—Lisa Bannapradist
(74) Attorney, Agent, or Firm—Jones, Tullar, & Cooper, P.C.

(57) ABSTRACT

The present invention provides a gland packing in which a phenomenon where reinforcing fibers protruding from ends of adjacent braiding yarns overlap with each other, and the over-lapping reinforcing fibers are interposed over the whole range between expanded graphite tapes of the adjacent braiding yarns to form a leakage path can be reduced. In the gland packing 4, ends 1a, 1b in the width direction of each of the braiding yarns 3A to 3H constituting the gland packing are directed to the inner side in the width direction, and the reinforcing fibers 2A to 2H protruding from the ends 1a, 1b are confined to the inner side of the braiding yarns 3A to 3H.

4 Claims, 8 Drawing Sheets

GLAND PACKING

TECHNICAL FIELD

The present invention relates to a gland packing which can be preferably used in a shaft seal of a fluid apparatus or the like.

BACKGROUND ART

Conventionally, as a gland packing which can be used in a shaft seal part of a fluid apparatus or the like, for example, known is a gland packing 4 such as shown in FIG. 7. As shown in FIG. 6, the gland packing is braided (for example, 8-element square braided) by using a plurality of braiding yarns 3 each configured by a braiding yarn base material 6 in which a plurality of reinforcing fibers 2, 2 are embedded in the longitudinal direction in an expanded graphite tape 1 of a predetermined width with forming gaps in the width direction.

In the braiding yarn base material 6 shown in FIG. 6, however, the reinforcing fibers 2, 2 sometimes protrude largely from both or one of ends 1a, 1b in the width direction of the expanded graphite tape 1 which is cut into a predetermined width. In the gland packing 4 which is braided by using a plurality of braiding yarns 3 each configured by such a braiding yarn base material 6, the reinforcing fibers 2, 2 protrude from both or one of the ends 1a, 1b in the width direction of the expanded graphite tape 1 even after braiding.

In this case, when, as shown in FIG. 8, for example, in two braiding yarns 3 from which the reinforcing fibers 2, 2 protrude, the reinforcing fiber 2A protruding from one end 1a of the braiding yarn 3A, and the reinforcing fiber 2B protruding from another end 1b of the braiding yarn 3B overlap with each other, and the overlapping reinforcing fibers 2A and 2B are interposed over the whole range between the expanded graphite tapes 1 of the adjacent braiding yarns 3A and 3B and reach the whole range between the expanded graphite tapes 1 of the adjacent braiding yarns 3A and 3C, a large leakage path 5A is formed.

When the reinforcing fiber 2C protruding from another end 1b of the braiding yarn 3C, and the reinforcing fiber 2D protruding from one end 1a of the braiding yarn 3D overlap with each other, the overlapping reinforcing fibers 2C and 2D are interposed over the whole range between the expanded graphite tapes 1 of the adjacent braiding yarns 3C and 3D and reach the whole range between the expanded graphite tapes 1 of the adjacent braiding yarns 3D and 3H, a large leakage path 5B is formed.

In the gland packing 4 in which such leakage paths 5A and 5B are formed, the sealing performance is naturally largely lowered. As the number of the braiding yarns 3 is further increased to twelve, sixteen, or more, the possibility of formation of leakage paths is easily made higher, or the number of the leakage paths is easily made larger. This is not restricted to the gland packing 4 in which the plurality of the braiding yarns 3 are braided, and is applicable also to the gland packing 4 in which the plurality of the braiding yarns are twisted.

It is an object of the invention to provide a gland packing having a structure in which a phenomenon where reinforcing fibers protruding from ends of adjacent braiding yarns overlap with each other, and the overlapping reinforcing fibers are interposed over the whole range between expanded graphite tapes to form a leakage path can be reduced or prevented from occurring.

SUMMARY OF THE INVENTION

The gland packing of the invention is a gland packing of a braided structure where a plurality of braiding yams in which reinforcing fibers are embedded in an expanded graphite tape exist, wherein an end in a width direction of each of the braiding yams is directed to an inner side in the width direction of the braiding yarn.

In the thus configured gland packing of a braided structure, even when the reinforcing fibers largely protrude from ends in the width direction of the braiding yarns, the largely protruding reinforcing fibers can be directed or confined to the inner side of the braiding yarns because an end in the width direction of each of the braiding yarns is directed to the inner side in the width direction of the braiding yarn. Therefore, a phenomenon where reinforcing fibers protruding from ends in the width direction of adjacent braiding yarns overlap with each other, and the overlapping reinforcing fibers are interposed over the whole range between expanded graphite tapes of the adjacent braiding yarns to form a large leakage path can be reduced or prevented from occurring.

The other gland packing of the invention is a gland packing of a twisted structure where a plurality of braiding yarns in which reinforcing fibers are embedded in an expanded graphite tape exist, wherein an end in a width direction of each of the braiding yarns is directed to an inner side in the width direction of the braiding yarn.

Also in the thus configured gland packing of a twisted structure, in the same manner as the gland packing of a braided structure, the reinforcing fibers largely protruding from ends in the width direction of the braiding yarns can be directed or confined to the inner side of the braiding yarns. Therefore, a phenomenon where reinforcing fibers protruding from ends in the width direction of adjacent braiding yarns overlap with each other, and the overlapping reinforcing fibers are interposed over the whole range between expanded graphite tapes of the adjacent braiding yarns to form a large leakage path can be reduced or prevented from occurring.

Preferably, both the ends in the width direction of each braiding yarn are preferably directed to the inner side in the width direction of the braiding yarn. Even in the case of one end, however, the possibility of formation of a large leakage path is greatly reduced, and occurrence of defective products is greatly reduced.

DETAILED DESCRIPTION OF THE PREFERRED EMBODIMENTS

Figure 1:
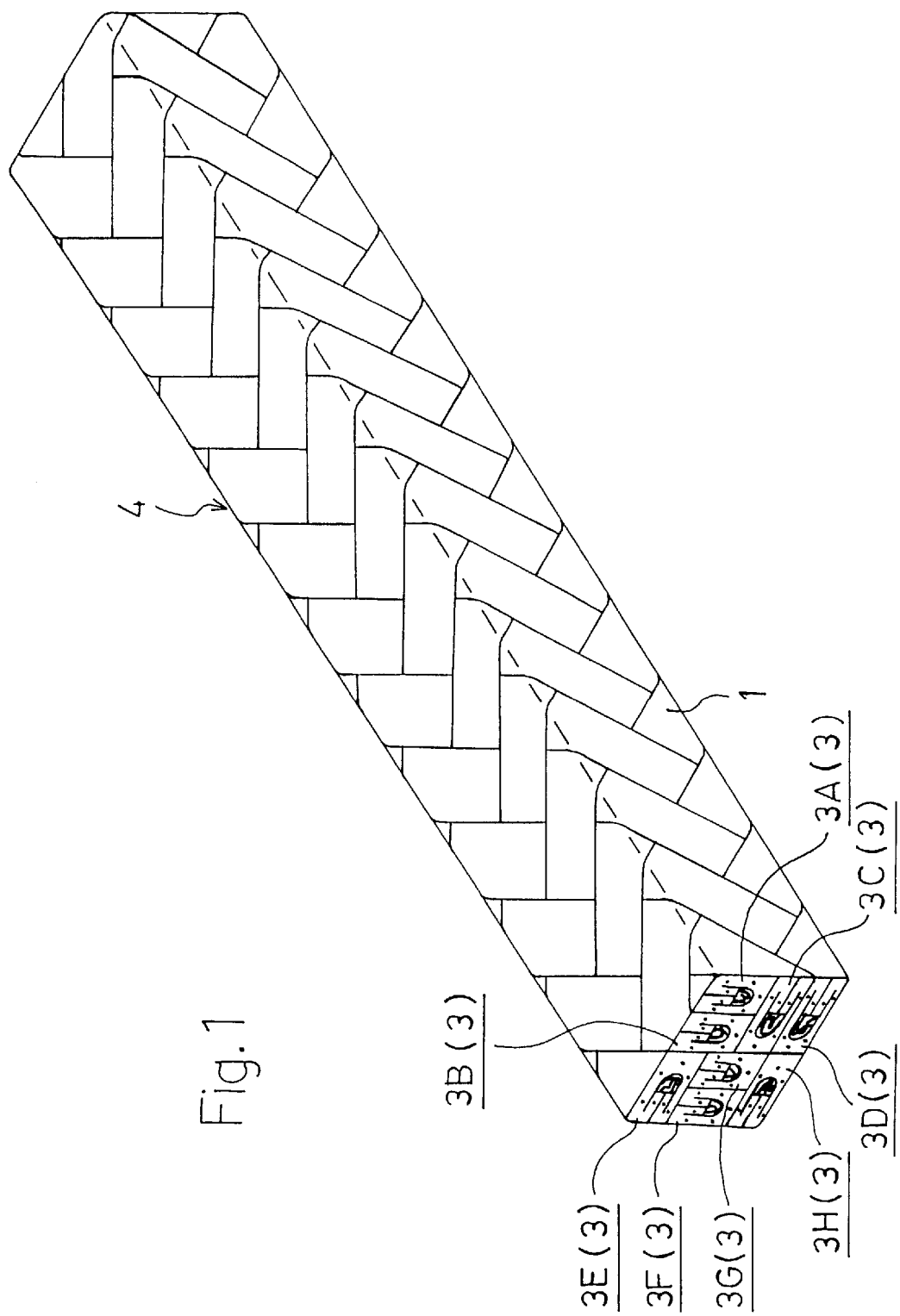
FIG. 1 is a perspective view of a gland packing showing an embodiment of the invention.
Figure 2:
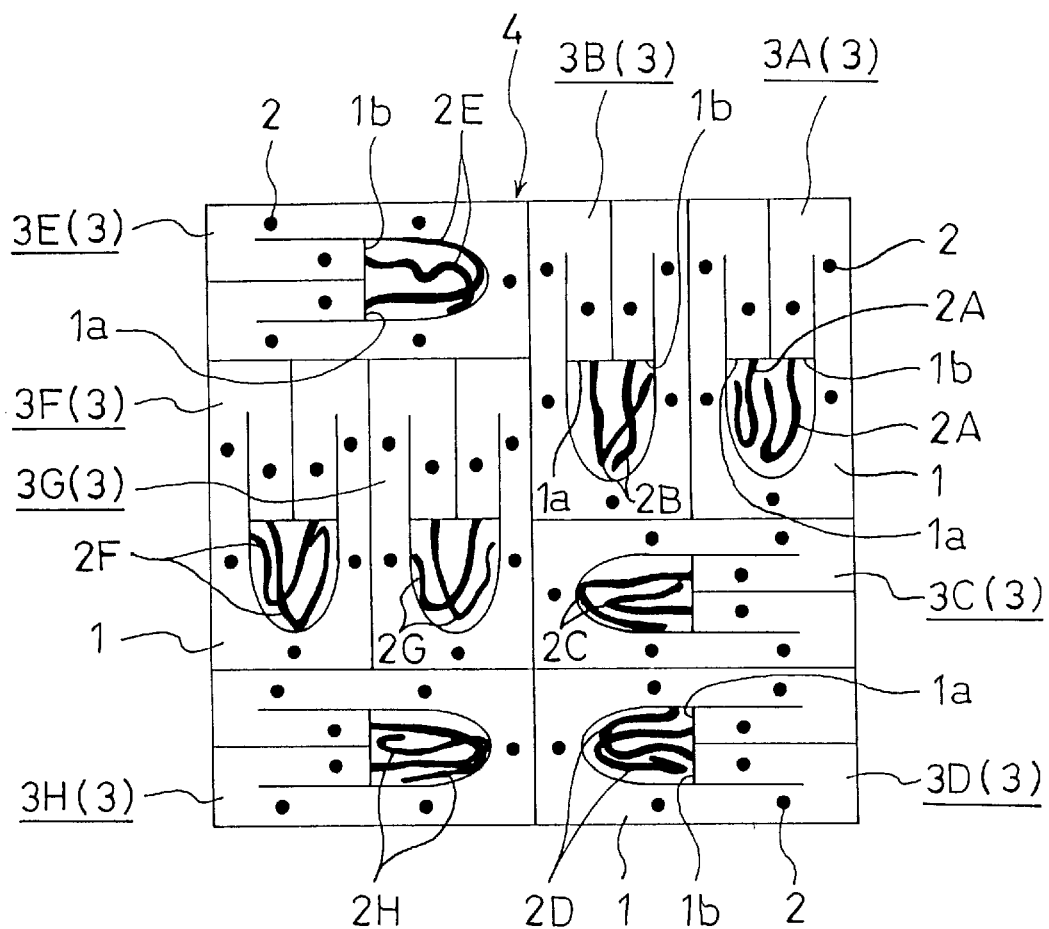
FIG. 2 is an enlarged section view of the gland packing of FIG. 1.
Figure 3:
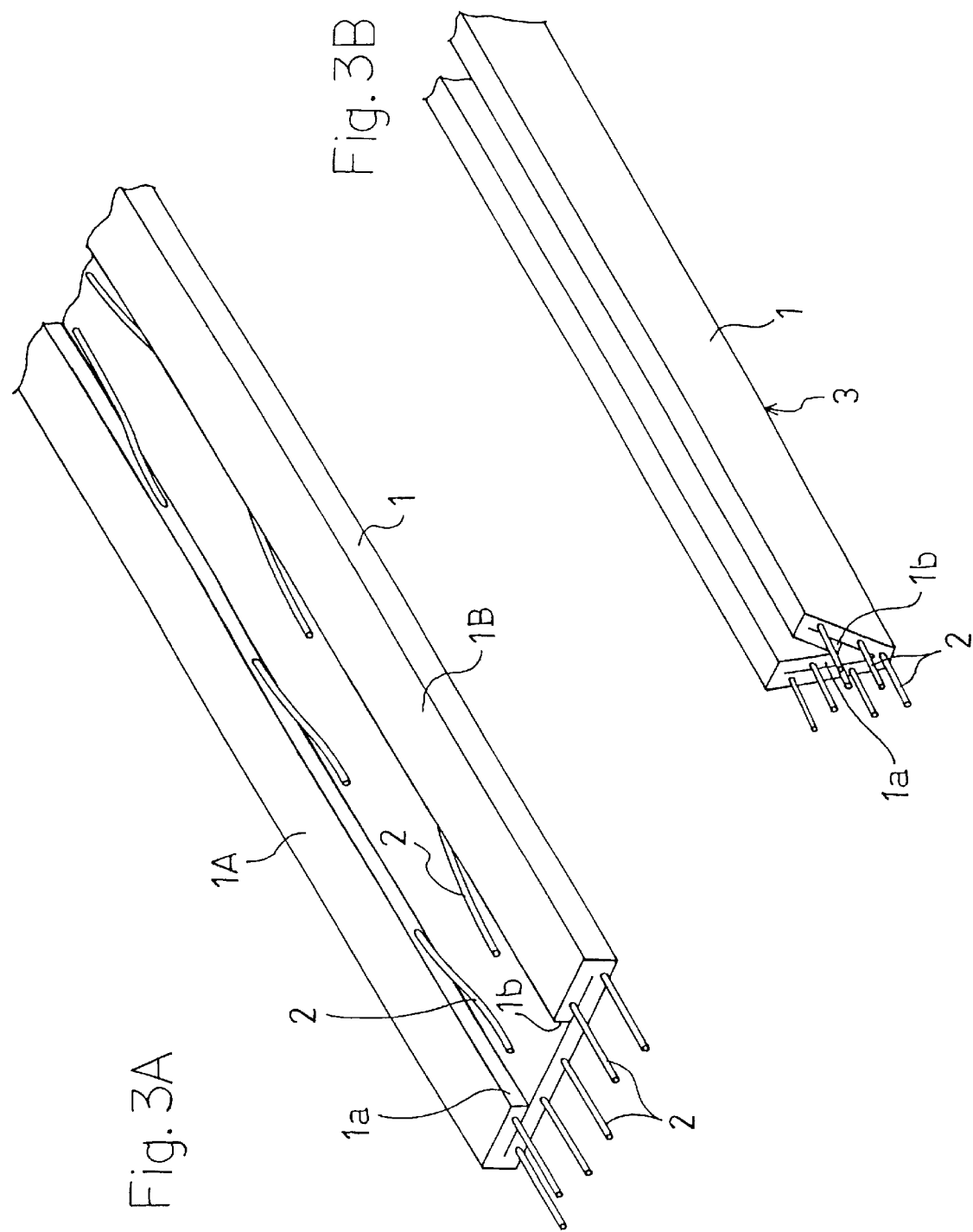
FIG. 3A is a perspective view of a state where both end portions in the width direction of a braiding yarn which is to be used in a braiding or twisting process of the gland packing of the invention are bent so as to be directed toward the inner side in the width direction.
FIG. 3B is a perspective view of a state where the braiding yarn shown in FIG. 3A is further folded into a valley fold in the longitudinal direction.
Figure 6:
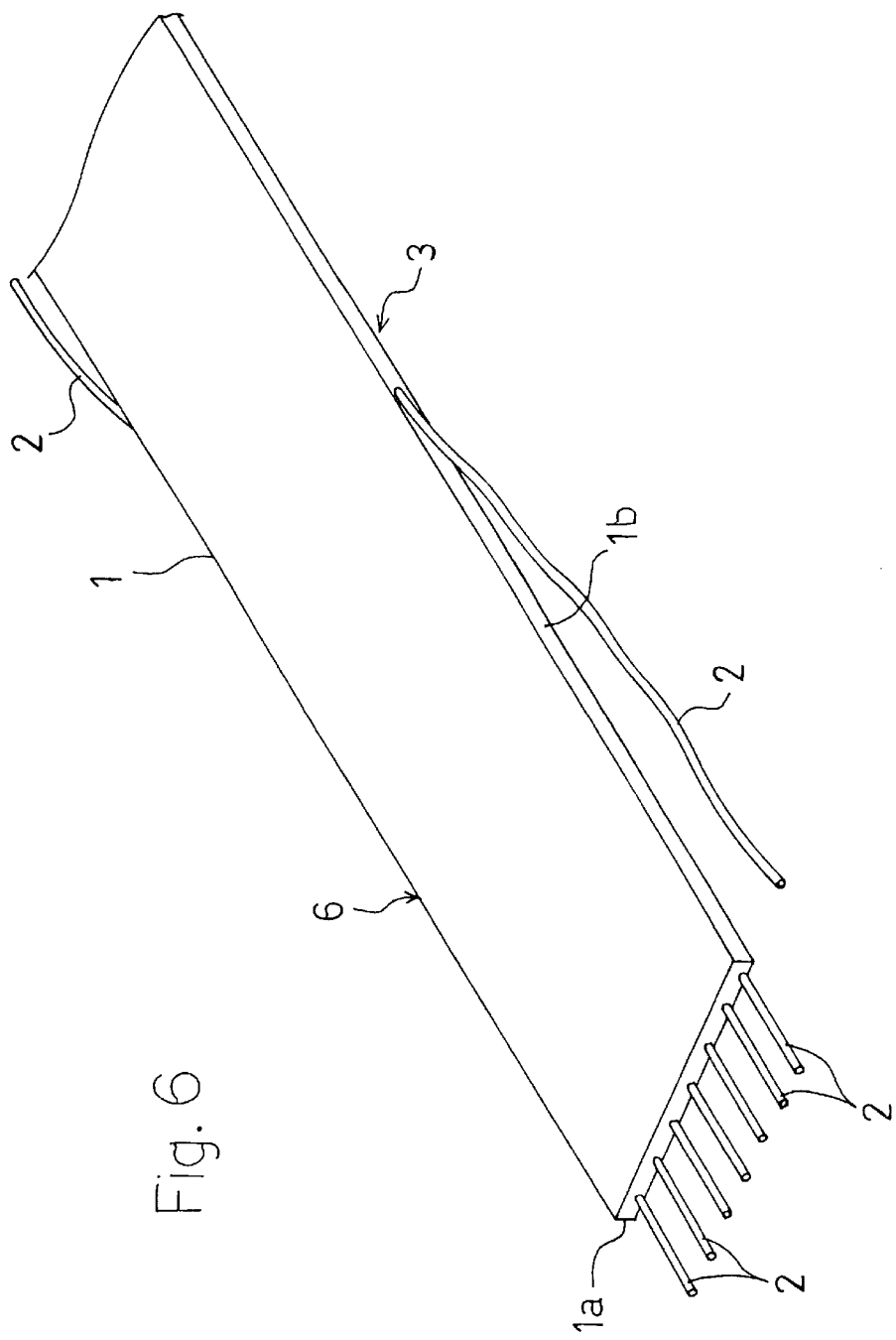
FIG. 6 is a perspective view of a braiding yarn which is to be used in a braiding or twisting process of a conventional gland packing.
Figure 7:
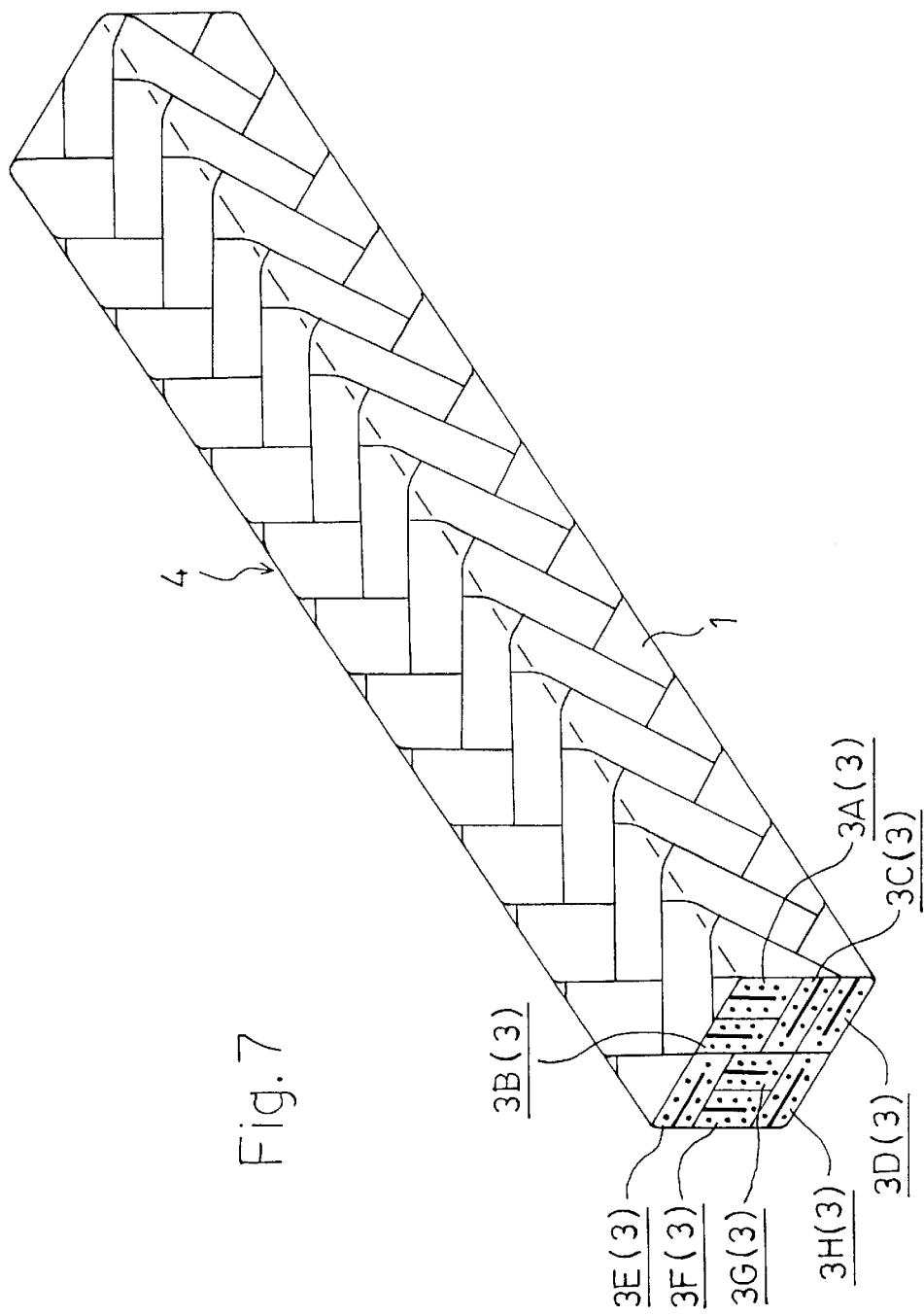
FIG. 7 is a perspective view showing an example of a conventional gland packing.

FIG. 1 is a perspective view showing an embodiment of the gland packing of the invention, and FIG. 2 is an enlarged section view of FIG. 1. Referring to FIGS. 1 and 2, in the gland packing 4, eight braiding yarns 3A, 3B, 3C, 3D, 3E, 3F, 3G, and 3H exist (8-element square braid). The braiding yarns 3A to 3H are braided in the following manner. Both the end portions 1A, 1B of the braiding yarn base material 6 shown in FIG. 6 are bent so as to be directed toward the inner side in the width direction as shown in FIG. 3A, whereby the ends 1a, 1b are directed to the inner side in the width direction. The braiding yarn base material is further folded into a valley fold in the longitudinal direction as shown in FIG. 3B, and then twined to form a braiding yarn. A plurality (eight) of such braiding yarns are bundled and braided.

As the reinforcing fibers 2, used is one selected from organic fibers such as cotton, rayon, phenol, aramid, PBO, PBI, PTFE, PPS, and PEEK; one selected from inorganic fibers such as glass fiber, carbon fiber, and ceramic fiber; or one selected from metal wires such as stainless steel, inconel, and monel. Of course, the organic fibers, the inorganic fibers, and the metal wires may be adequately selected to be combinedly used.

As described above, the ends 1a, 1b in the width direction of the plurality of braiding yarns 3A to 3H which are bundled and braided are directed to the inner side in the width direction. Even when reinforcing fibers 2A, 2B, 2C, 2D, 2E, 2F, 2G, and 2H largely protrude from the ends 1a, 1b in the width direction of all the braiding yarns 3A to 3H, therefore, the reinforcing fibers 2A to 2H protruding from the ends 1a, 1b are confined to the inner side of the braiding yarns 3A to 3H as apparent from FIG. 2. Consequently, not only a phenomenon where the reinforcing fibers (2A to 2F) protruding from the one ends 1a or the other ends 1b of the braiding yarns 3 overlap with each other, and the overlapping reinforcing fibers are interposed over the whole range between expanded graphite tapes 1 of the adjacent braiding yarns 3, 3, but also that where the reinforcing fibers are interposed in part between the expanded graphite tapes 1 are effectively prevented from occurring.

Figure 4:
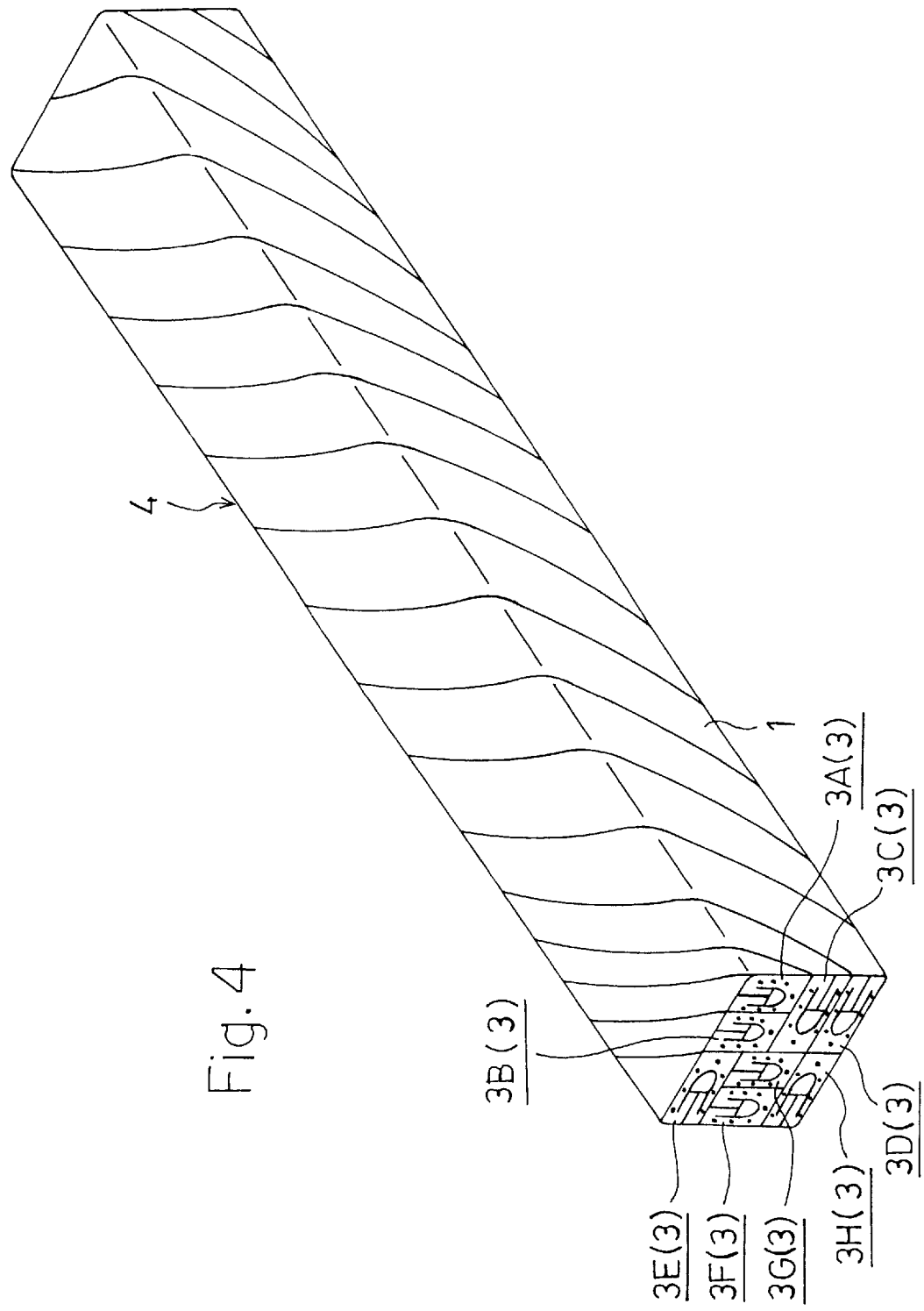
FIG. 4 is a perspective view of a gland packing showing another embodiment of the invention.

FIG. 4 is a perspective view showing another embodiment of the gland packing of the invention. The description will be made with denoting the portions identical or corresponding to those of the gland packing of the above-described embodiment by the same reference numerals. Referring to FIG. 4, in the gland packing 4, eight braiding yarns 3A to 3H are twisted. The braiding yarns 3A to 3H are twisted in the following manner. In the same manner as the gland packing of the above-described embodiment, each expanded graphite tape 1 is bent so that the ends 1a, 1b in the width direction of the tape are directed to the inner side in the width direction. Thereafter, the expanded graphite tape is folded into a valley fold in the longitudinal direction, and twined to form a braiding yarn. A plurality (eight) of such braiding yarns are bundled and twisted. Therefore, the section shape of the gland packing 4 is substantially identical with the section shape of FIG. 2. In the same manner as the gland packing 4 of the above-described embodiment, consequently, a phenomenon where the reinforcing fibers protruding from the one ends 1a or the other ends 1b of the braiding yarns 3 overlap with each other, and the overlapping reinforcing fibers are interposed over the whole range between the expanded graphite tapes 1 of the adjacent braiding yarns 3, 3 can be prevented from occurring, and also that where the reinforcing fibers are interposed in part between the expanded graphite tapes 1 can be effectively prevented from occurring.

Figure 5:
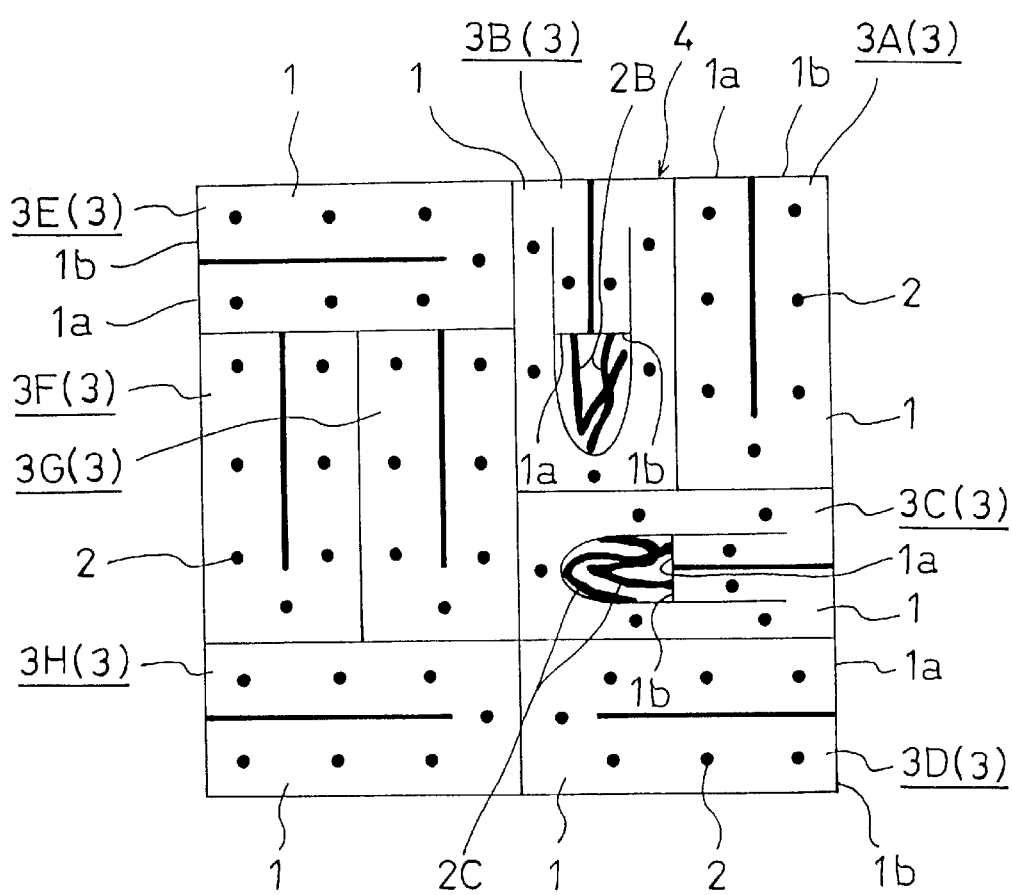
FIG. 5 is an enlarged section view of a gland packing showing a further embodiment of the invention.
Figure 8:
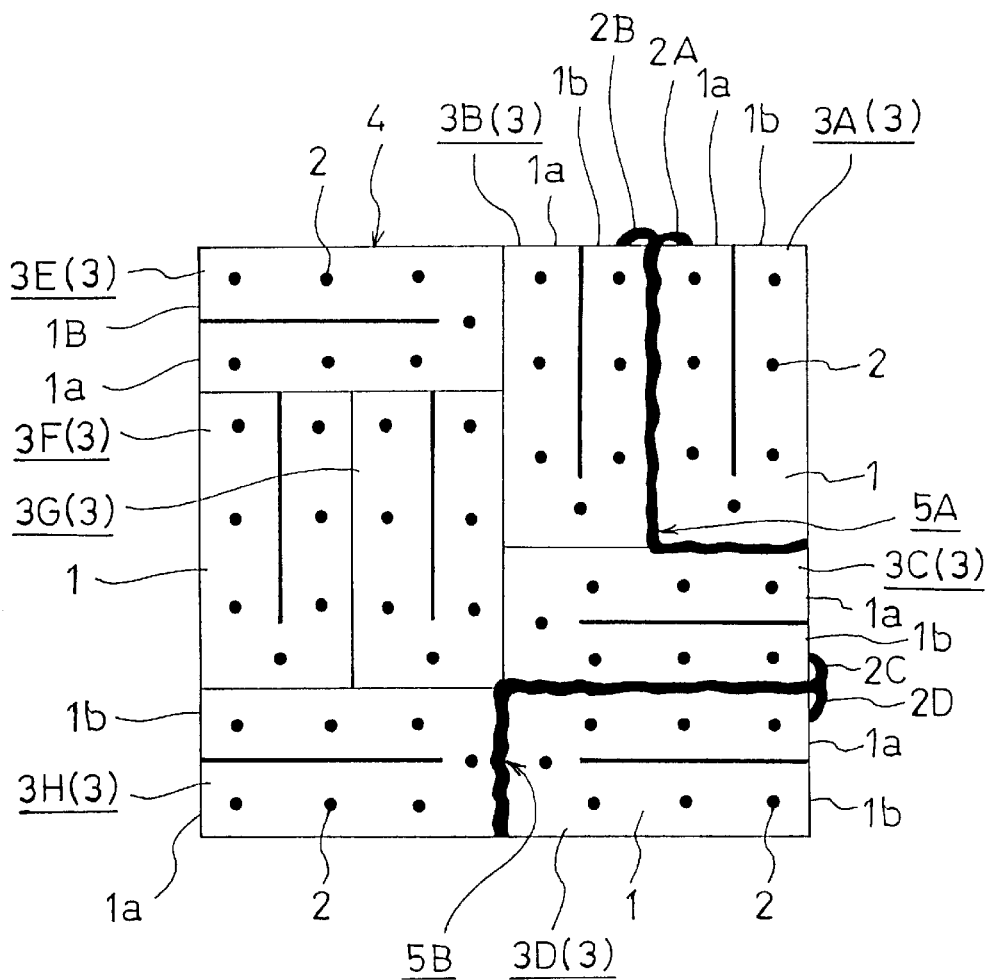
FIG. 8 is an enlarged section view of a gland packing shown in FIG. 7.

In the above-described embodiment, with respect to all of the braiding yarns 3A to 3H, the ends 1a, 1b in the width direction of the expanded graphite tape 1 are directed to the inner side in the width direction. However, it is required only that the overlapping reinforcing fibers protruding from the ends of the braiding yarns are prevented from being interposed over the whole range between the expanded graphite tapes 1, 1 of the adjacent braiding yarns. It is not always requested that, with respect to all of the braiding yarns 3A to 3H, the ends 1a, 1b in the width direction of the expanded graphite tape 1 are directed to the inner side in the width direction. When the ends 1a, 1b in the width direction of the expanded graphite tape 1 in two braiding yarns 3B and 3C are directed to the inner side in the width direction as shown in FIG. 5, for example, the reinforcing fibers 2B, 2C are confined to the inner side of the braiding yarns 3B, 3C, and hence the leakage paths 5A and 5B such as shown in FIG. 8 are not formed.

In the above-described embodiment, the eight braiding yarns 3A to 3H are bundled and braided or twisted to constitute the gland packing 4. The number of braiding yarns which are to be braided or twisted is not restricted to eight. Alternatively, the gland packing 4 may be configured by bundling and braiding or twisting eight or more, for example, twelve or sixteen braiding yarns.

In the above-described embodiment, in order to direct the ends 1a, 1b in the width direction of each of the braiding yarns 3 constituting the gland packing 4 to the inner side in the width direction of the braiding yarn 3, both the end portions 1A, 1B of the braiding yarn base material 6 shown in FIG. 6 are bent so as to be directed toward the inner side in the width direction. The braiding yarn base material is folded into a valley fold in the longitudinal direction, and thereafter twined to form a braiding yarn. A plurality of such braiding yarns are bundled and braided or twisted. It is a matter of course that the invention is not restricted to such a method. Namely, it is required only that the end 1a or 1b in the width direction of each of the braiding yarns 3 constituting the gland packing 4 is directed to the inner side in the width direction. For example, at least the one end portions 1A, 1B in the width direction of the braiding yarn base material 6 may be previously formed into a curled shape, a spiral shape, an obliquely inward-directed shape, or another shape, and, during the braiding or twisting process, at least the ends 1a, 1b in the width direction of the braiding yarns 3 may be caused to be directed to the inner side in the width direction of the braiding yarns 3. In summary, it is required that, after the braiding or twisting process, at least the end 1a, 1b in the width direction of the braiding yarns 3 is caused to be directed to the inner side in the width direction of the braiding yarns 3.

INDUSTRIAL APPLICABILITY

The invention attains an effect that, in a gland packing of the type in which reinforcing fibers are embedded and expanded graphite tapes of braiding yarns are directly abutted against each other, a phenomenon where reinforcing fibers protruding from ends of adjacent braiding yarns overlap with each other, and the overlapping reinforcing fibers are interposed over the whole range between the expanded graphite tapes to form a leakage path can be reduced or prevented from occurring.

What is claimed is:

1. A gland packing of a braided structure where a plurality of braiding yarns in which reinforcing fibers are embedded in an expanded graphite tape exist, wherein both ends of each braiding yarn are bent so as to be directed toward the inner side in the width direction of said braiding yarn.

2. A gland packing of a twisted structure where a plurality of braiding yarns in which reinforcing fibers are embedded in an expanded graphite tape exist, wherein both ends of each braiding yarn are bent so as to be directed toward the inner side in the width direction of said braiding yarn.

3. The gland packing as defined in claim 1, wherein each braiding yarn is further folded into a valley fold in the longitudinal direction.

4. The gland packing as defined in claim 2, wherein each braiding yarn is further folded into a valley fold in the longitudinal direction.

* * * * *